United States Patent [19]

Lonsberry

[11] Patent Number: 5,236,317
[45] Date of Patent: Aug. 17, 1993

[54] GEAR PUMP VALVING SYSTEM
[75] Inventor: Kenneth F. Lonsberry, Hudson, Ohio
[73] Assignee: Permco, Inc., Streetsboro, Ohio
[21] Appl. No.: 765,670
[22] Filed: Sep. 26, 1991
[51] Int. Cl.⁵ .................. F04B 49/00; F04B 23/00
[52] U.S. Cl. ................................. 417/308; 417/310; 417/440
[58] Field of Search ............ 417/310, 308, 440, 299; 251/58

[56] References Cited
U.S. PATENT DOCUMENTS

| | | | |
|---|---|---|---|
| 3,427,981 | 2/1969 | Jansson | 417/308 |
| 3,698,839 | 10/1972 | Distefano | 417/299 |
| 4,029,290 | 6/1977 | Karpenko | 251/58 |
| 4,597,556 | 7/1986 | Sandling | 251/58 |
| 4,813,749 | 3/1989 | Cilles | 251/58 |
| 4,890,645 | 1/1990 | Anderson | 251/58 |

Primary Examiner—Richard A. Bertsch
Assistant Examiner—Alfred Basichas
Attorney, Agent, or Firm—James A. Hudak

[57] ABSTRACT

A gear pump having a bypass valve within its port end cover is disclosed. The bypass valve is spring biased to open, pressure to close, rather than being pressure compensated, preventing hydraulic fluid from being "bled off" during the entire work cycle. A butterfly type structure is utilized for the dry valve which is attached to the inlet of the gear pump thus eliminating the need for a cumbersome device for actuating same.

19 Claims, 4 Drawing Sheets

GEAR PUMP VALVING SYSTEM

TECHNICAL FIELD

The present invention relates, in general, to a gear pump having a dry valve assembly connected thereto and an external bypass valve arrangement to direct hydraulic fluid to an oil reservoir and, more particularly, to a novel butterfly type dry valve attached to the gear pump and a bypass valve arrangement formed within the gear pump.

BACKGROUND ART

One of the applications of gear pumps is in the mobile refuse removal industry. In such applications, the gear pump is typically mounted off the crankshaft in front of the engine and is operational whenever the engine is running. By mounting the gear pump in such a manner, the use of transmission power take-offs is eliminated, thus saving the cost of the power take-off and the plumbing associated therewith. In such mobile refuse removal applications, hydraulic pressure is typically required for short, intermittent periods of time, but the operator does not have the ability to disengage the gear pump when not in use. The foregoing problem is minimized by the use of a dry valve assembly attached to the inlet of the gear pump. When hydraulic pressure is required, the dry valve is opened permitting the flow of hydraulic fluid through the valve into the gear pump and out into the hydraulic work circuit. Conversely, when hydraulic pressure is not required, the dry valve is closed preventing the flow of hydraulic fluid therethrough to the gear pump. Since the gear pump is running at all times, lubrication of its internal components (gears, bearings, etc.) is required. When the dry valve is in the open position, such lubrication is effected by the flow of hydraulic fluid through the gear pump to the hydraulic work circuit. When, however, the dry valve is in the closed position preventing the flow of hydraulic fluid to the pump, lubrication of the foregoing internal components must be effected by other means. In prior art systems, such lubrication is effected by means of a small aperture within a shut-off plate in the dry valve. The foregoing aperture permits a limited flow of hydraulic fluid therethrough to the gear pump even when the dry valve is in the closed position. Since a given amount of hydraulic fluid is being drawn into the gear pump, a similar amount of hydraulic fluid flow must be discharged therefrom. In the prior art systems, the hydraulic fluid flow from the pump has a discharge pressure sufficient to cause cavitation resulting in the degradation or the removal of metal from internal gear pump components and the creation of abnormally high noise levels. The amount of cavitation depends upon the discharge pressures attained. To minimize cavitation the prior art systems utilize a pressure compensated bypass valve mounted externally to the gear pump-dry valve assembly and fluidically interconnecting the outlet port of the gear pump to the hydraulic work circuit. Any flow of hydraulic fluid within the gear pump for lubrication purposes while in the "dry" mode of operation passes directly through the bypass valve to the oil system reservoir thus eliminating back pressure build-up which, in turn, minimizes cavitation and the noise associated therewith. One of the primary disadvantages of using a pressure compensated type bypass valve is that it "bleeds" off a given amount of hydraulic fluid during the entire work cycle reducing the output horsepower of the gear pump. In addition, since the pressure compensated bypass valve is not an integral part of the gear pump, installation of the complete gear pump-dry valve system requires additional time for the mounting of the bypass valve.

Because of the foregoing disadvantages associated with the prior art systems, it has become desirable to develop a gear pump system wherein the structure of the dry valve is relatively simple and compact and wherein the bypass valve is an integral part of the gear pump and is not of the pressure compensated type.

SUMMARY OF THE INVENTION

The present invention solves the foregoing problems associated with the prior art systems and other problems by providing a bypass valve within the port end cover of the gear pump rather than being mounted externally to the gear pump. The bypass valve of the present invention is not pressure compensated, i.e., it is spring biased to open, pressure to close. Thus, when the hydraulic work circuit achieves operating pressure, the bypass valve of the present invention closes so as to direct any bypass hydraulic fluid flow to the hydraulic work circuit, thus conserving energy. Because the bypass valve of the present invention is spring biased to open, pressure to close, a given amount of hydraulic fluid is not "bled off" during the entire work cycle reducing the output horsepower of the pump, as in the prior art systems. The present invention also includes a unique butterfly type structure for the dry valve, thus eliminating the need for the cumbersome actuating device associated with the prior art dry valve assemblies.

DESCRIPTION OF THE PREFERRED EMBODIMENT

Figure 1:
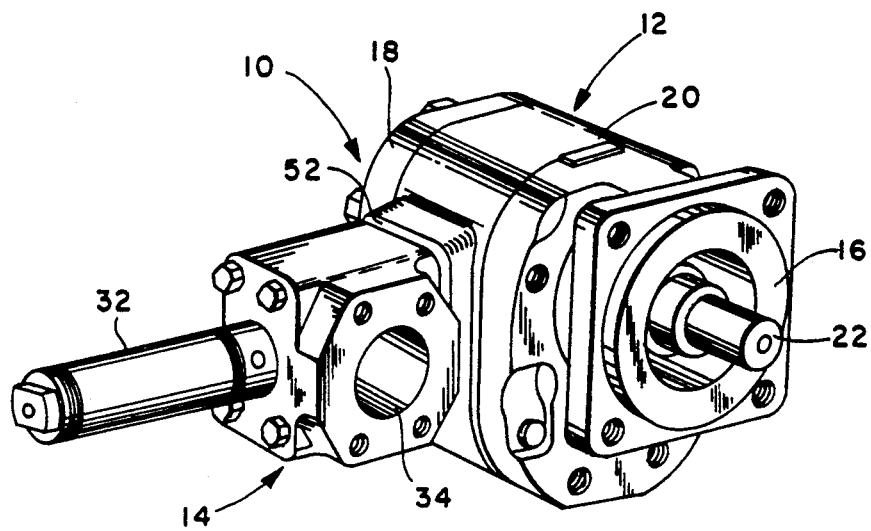
FIG. 1 is perspective view of a prior art gear pump-dry valve assembly.

Referring now to the drawings where the illustrations are for the purpose of describing the preferred embodiment of the present invention and are not intended to limit the invention described herein, FIG. 1 is a perspective view of a prior art gear pump-dry valve assembly 10 comprising a gear pump, shown generally by the numeral 12, and a dry valve, shown generally by the numeral 14, attached to the gear pump 12. The gear pump 12 is comprised of a shaft end cover 16, a port end cover 18, a gear housing 20 interposed therebetween, and a drive shaft 22 projecting outwardly from the shaft end cover 16. The drive shaft 22 and the shaft end cover 16 are attached directly to a prime mover, such as a gasoline or diesel engine (not shown), so that the gear pump 12 is operating whenever the prime mover is operating. By attaching the gear pump-dry valve assembly 10 directly to the prime mover, the use of a transmission power take-off is eliminated, thus saving the cost of same and any components associated therewith. Since the gear pump-dry valve assembly 10 is attached directly to the prime mover, the gear pump 12 is always operating whenever the prime mover is operating. Such a situation creates excessive horsepower consumption and substantial heat generation within the gear pump 12 and the hydraulic fluid which is utilized as the pumping medium. In order to minimize horsepower consumption and heat generation, apparatus has been developed whereby the inlet or suction side of the gear pump 12 can be shut off during those times when pump operation is not required, thus eliminating the pumping action resulting in conservation of horsepower. Due to the inherent design of the gear pump 12, lubrication of its internal parts (gears, bearings, etc.), as hereinafter described, is required at all times during pump operation.

Figure 2:
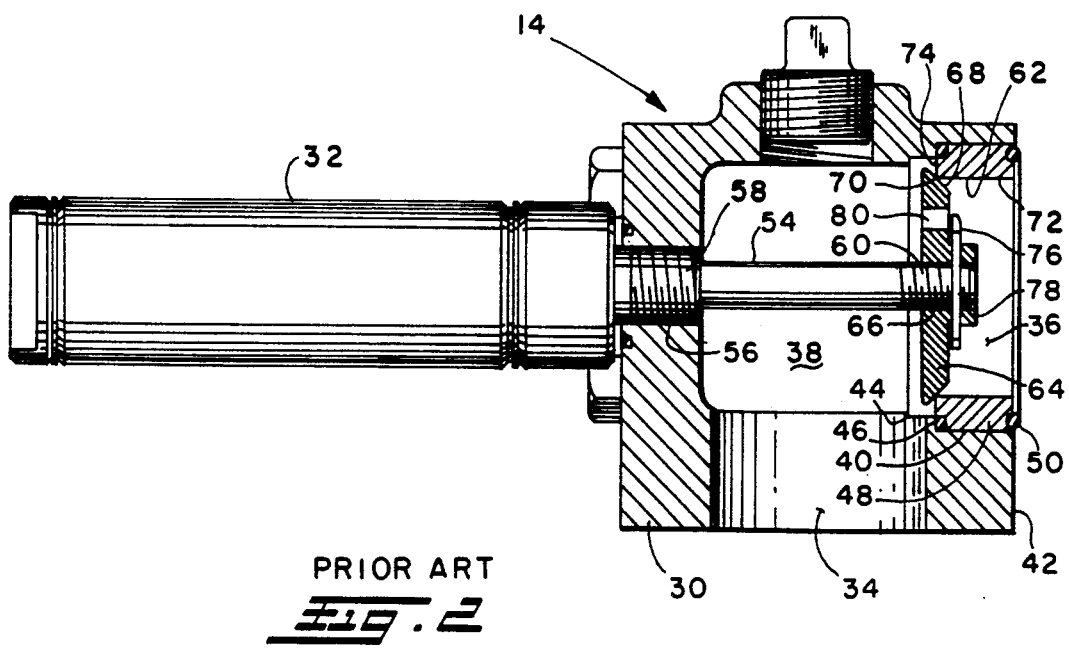
FIG. 2 is a partial cross-sectional view of the prior art dry valve illustrated in FIG. 1.

A partial cross-sectional view of the prior art dry valve 14 is illustrated in FIG. 2. Dry valve 14 includes housing 30 and a cylinder rod 32, a portion of which is received within the housing 30. Housing 30 is provided with an inlet port 34 and an outlet port 36 both communicating with a chamber 38. The axis of the inlet port 34 is substantially perpendicular to the axis of outlet port 36. Outlet port 36 is in the form of a stepped bore having a first diameter portion 40 which intersects face 42 of housing 30 and a second diameter portion 44 which connects circumferential surface 46 defining the bottom of first diameter portion 40 with chamber 38. A seal bushing 48 is received within first diameter portion 40 and includes an 0-ring 50 adjacent both circumferential surface 46 and face 42 to provide a sealing surface between face 42 on the housing 30 of the dry-valve 14 and the inlet face 52 provided on the gear housing 20 of the gear pump 12. Portion 54 of cylinder rod 32 is received through threaded bore 56 in housing 30 and threaded portion 58 thereof threadably engages bore 56. End 60 of cylinder rod 32 is threaded and extends into bore 62 within seal bushing 48. A circumferential seal plate 64 having a threaded bore 66 therethrough is threadably received on end 60 of cylinder rod 32 and is provided with a beveled circumferential surface 68 which engages the circumferential surface 70 defined by the junction of surfaces 72 and 74 on seal bushing 48. A cotter pin 76 is received through hub 78 in seal plate 64 and through threaded end 60 of cylinder rod 32 to secure plate 64 to cylinder rod 32. An aperture 80 is provided within seal plate 64 to permit the passage of hydraulic fluid from the inlet port 34 through chamber 38 to the outlet port 36 of the housing 30. In this manner, sufficient hydraulic fluid can pass through the dry valve 14 via inlet port 34, chamber 38, aperture 80 within seal plate 64, to outlet port 36 in order to lubricate the gears and bearings within gear pump 12 when the dry valve 14 is in the closed position. In order to open dry valve 14, cylinder rod 32 is rotated in a direction so as to move outwardly relative to housing 30 resulting in beveled circumferential surface 68 on seal plate 64 becoming disengaged from circumferential surface 70 on seal bushing 48. In this manner, hydraulic fluid can pass through the dry valve 14 to the gear pump 12 via inlet port 34, chamber 38, aperture 80 and the annular area between beveled circumferential surface 68 on seal plate 64 and circumferential surface 70 on seal bushing 48 to outlet port 36.

When the dry valve 14 is operating in the "dry" mode, i.e., passage of hydraulic fluid only through aperture 80 to lubricate the gears within gear pump 12, a given amount of hydraulic fluid flow is being drawn into the gear pump 12 causing a given amount of fluid flow to be discharged therefrom. Depending upon the construction of the hydraulic work circuit, the hydraulic fluid flow from the gear pump 12 can generate sufficient pressure at the outlet of the pump to cause cavitation. Cavitation occurs when bubbles of air internal to the gear pump collapse upon themselves due to external pressures exceeding one atmosphere and typically result in the degradation or the removal of metal from the internal gear pump components due to excessively high localized tangential surface stresses at the point where the foregoing air bubble collapse occurs, and in abnormally high levels of noise. The degree of cavitation, and thus the amount of metal removed from the internal gear pump components and/or the noise level achieved depends upon the external or discharge pressure attained. To minimize cavitation, a standard pressure compensated bypass valve (not shown) is typically mounted externally to the gear pump-dry valve assembly 10 and is located between the discharge port of the gear pump 12 and the hydraulic work circuitry associated therewith. By placing the foregoing bypass valve in such a location, any flow of hydraulic fluid from the gear pump 12 while operating in the "dry" mode passes directly through the bypass valve to the oil system reservoir thus eliminating back pressure build-up which, in turn, minimizes cavitation and the noise associated therewith. One of the disadvantages of using a pressure compensated type bypass valve is that it "bleeds" off a given amount of hydraulic fluid during the entire work cycle, resulting in a reduction in the output horsepower of the gear pump. In addition, since the location of the pressure compensated bypass valve is external to that of the gear pump, installation of the gear pump-dry valve assembly 10 requires additional time for the mounting of the bypass valve.

Figure 3:
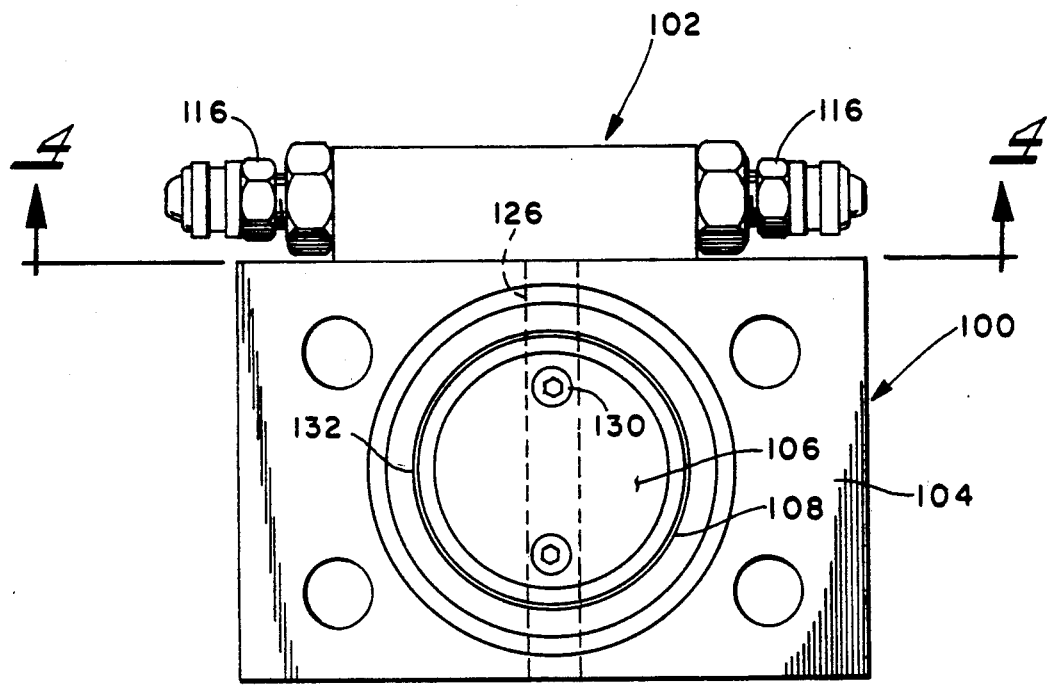
FIG. 3 is a front plan view of the dry valve of the present invention and the actuating mechanism for same, and illustrates the dry valve in the closed position.
Figure 4:
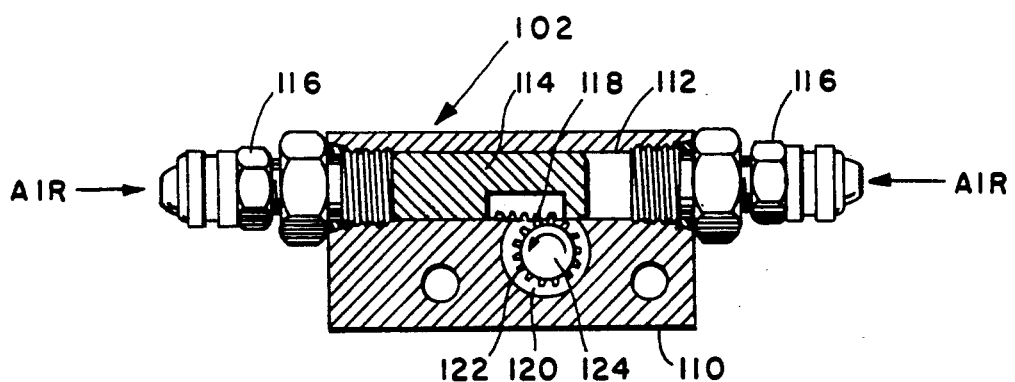
FIG. 4 is a cross-sectional view taken across section-indicating lines 4—4 of FIG. 3 and illustrates the relative position of the components within the actuating mechanism associated with the dry valve of the present invention when the dry valve is in the closed position.
Figure 5:
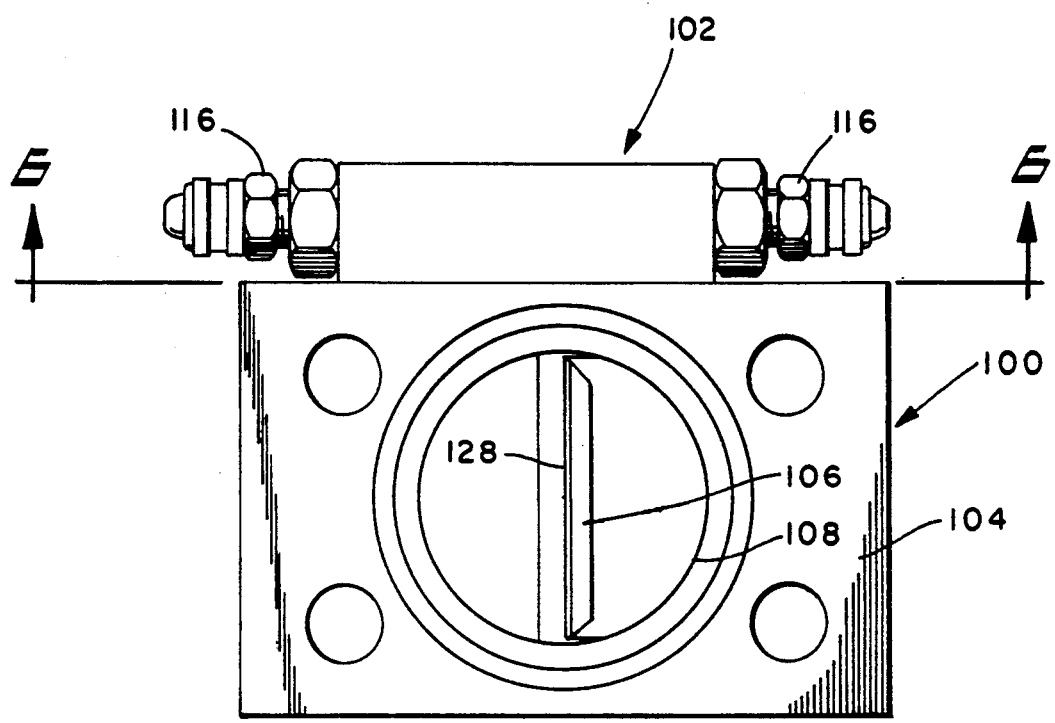
FIG. 5 is a front plan view of the dry valve of the present invention and the actuating mechanism for same, and illustrates the dry valve in the open position.
Figure 6:
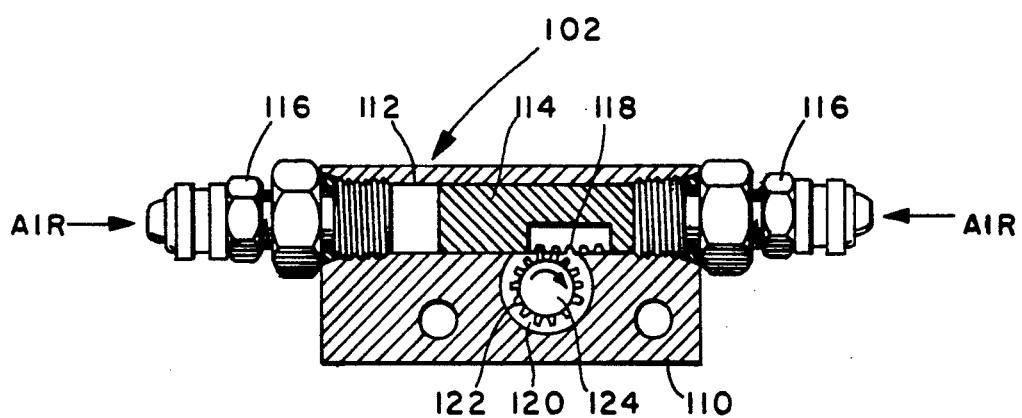
FIG. 6 is a cross-sectional view taken across section-indicating lines 6—6 of FIG. 5 and illustrates the relative position of the components within the actuating mechanism associated with the dry valve of the present invention when the dry valve is in the open position.

Referring now to FIGS. 3 and 4, a front plan view of the dry valve 100 of the present invention in the closed position and a cross-sectional view of the actuating mechanism 102 for same are illustrated. The dry valve 100 includes a valve body 104 and a butterfly valve plate 106 mounted within a bore 108 in the body 104. The actuating mechanism 102 is mounted on the body 104 and is connected to the valve plate 106 causing rotation of same, as hereinafter described. As shown in FIG. 4, the actuating mechanism 102 comprises a two-way valve including a valve body 110 having a longitudinally extending bore 112 therethrough with a piston 114 slidably receivable therein. Pneumatic fittings 116 are threadably receivable in the opposite ends of longitudinally extending bore 112 capturing piston 114 therein. Inwardly directed face of piston 114 is provided with a plurality of gear teeth 118 in the form of a gear rack. A blind bore 120 is provided within valve body 110 and is positioned so as to intersect a portion of longitudinally extending bore 112. The depth of blind bore 120 is sufficient to receive a gear 122 having teeth with a pitch complementary to that of the teeth of gear 118. Gear 122 is mounted on a shaft 124 which is received through a bore 126 in valve body 104 and positioned so that the teeth on gear 122 are in an intermeshing relationship with gear teeth 118 provided on piston 114. Shaft 124 has a flat 128 provided thereon permitting the attachment of valve plate 106 thereto by means of fasteners 130. The diameter of valve plate 106 is such so as to provide an annular area 132 between its periphery and the surface defining bore 108. When dry valve 100 is in the closed position, hydraulic fluid is allowed to pass therethrough via the annular area 132 thus eliminating the need for an aperture through the valve plate as in the prior art. In order to open the dry valve 100, air is introduced into left hand pneumatic fitting 116 causing the piston 114 to move to the right resulting in the rotation of the gear 122 and shaft 124 in a clockwise direction as viewed from the top of the actuating mechanism 102. Rotation of the gear 122 and shaft 124 causes the valve plate 106 to rotate through 90 degrees, as shown in FIGS. 5 and 6, allowing full flow of hydraulic fluid through bore 108 to the gear pump 12. Conversely, in order to close the dry valve 100, air is allowed to enter the actuating mechanism 102 via the right hand pneumatic fitting 116 causing the piston 114 to move to the left resulting in the gear 122 and shaft 124 rotating 90 degrees in the counter-clockwise direction (as viewed from the top of the actuating mechanism 102) causing the valve plate 106 to similarly rotate closing bore 108. In the closed condition, hydraulic fluid is allowed to pass through the dry valve 100 via the annular area 132 in order to lubricate the internal components in the gear pump 12.

Figure 7:
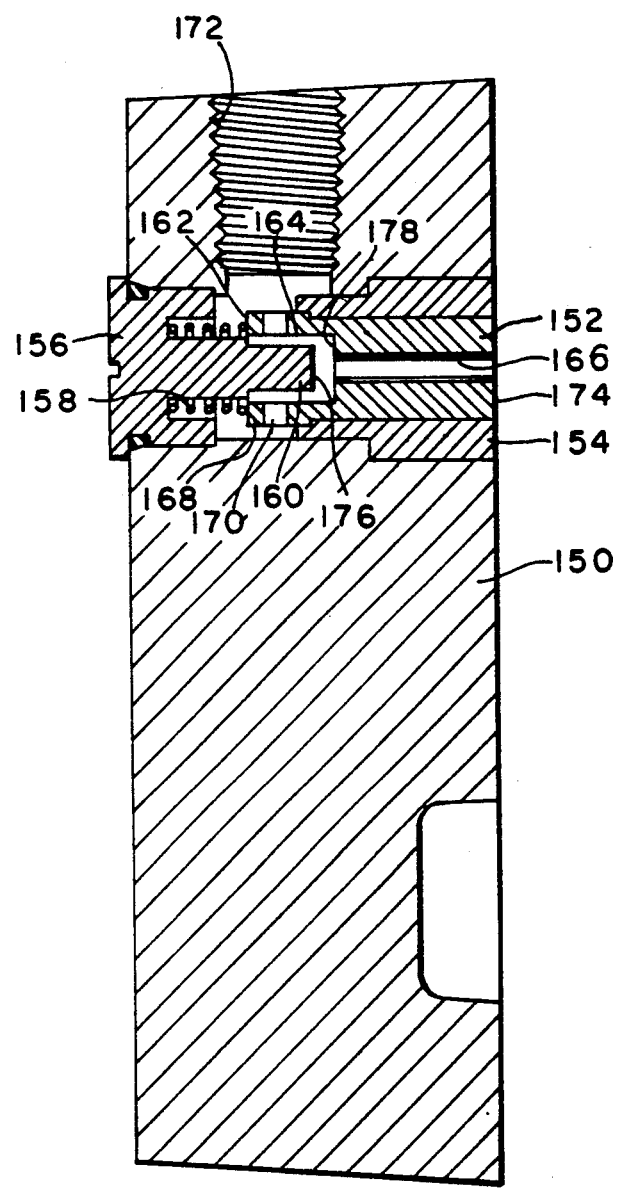
FIG. 7 is a cross-sectional view of the bypass valve of the present invention showing its position within the port end cover of the gear pump.

Rather than a pressure compensated type bypass valve as utilized in the prior art, the present invention involves a bypass valve 150, as illustrated in FIG. 7. Bypass valve 150 is integrally formed in the port end cover 18 of the gear pump 12, thus eliminating the need for a valve mounted externally thereto. Valve 150 includes a piston 152 slidably movable within a piston sleeve 154, a piston check member 156, and a compression spring 158 which is received over central portion 160 of piston check member 156. The free end of compression spring 158 contacts the end 162 of piston 152. Piston 152 has a stepped bore therethrough comprising a first bore portion 164 and a second bore portion 166. First bore portion 164 has a greater diameter than second bore portion 166, and is of sufficient size to receive the central portion 160 of piston check member 156. Circumferential surface 168 on piston 152 is provided with a plurality of cross-drilled apertures 170 therethrough. Apertures 170 are spaced approximately 60 degrees apart and the axis of each aperture 170 is substantially perpendicular to the longitudinal axis of the piston 152. The position of the apertures 170 is such so as to be substantially aligned with a threaded bore 172 in the port end cover 18 permitting the connection of the port end cover 18 to an oil system reservoir via a hose (not shown).

Operationally, hydraulic fluid is allowed to flow through the piston 152 via second bore portion 166, first bore portion 164, apertures 170, threaded bore 172 to the oil system reservoir. As system pressure increases, the force on the end 174 of piston 152 increases and begins to overcome the opposing force provided by the compression spring 158 against the end 162 of the piston 152 causing the piston 152 to move within the piston sleeve 154 towards the piston check member 156. While the foregoing is occurring, the flow of hydraulic fluid continues through the piston 152 via second bore portion 166, first bore portion 164 and apertures 170 to the oil system reservoir. The piston 152 continues to travel within piston sleeve 154 towards piston check member 156 until end 176 of piston check member 156 contacts surface 178 defining the bottom of first bore portion 164 in piston 152. The foregoing contact effectively blocks the opening of first bore portion 164 into second bore portion 166 in piston 152 preventing any further flow of hydraulic fluid therethrough to the oil system reservoir. This condition results in the hydraulic fluid that had been previously directed to the oil system reservoir being directed into the hydraulic work circuit. Conversely, as the force on end 174 of piston 152 begins to decrease due to a reduction in system operating pressure, the force provided by compression spring 158 begins to overcome the force on the end 174 of piston 152 causing the piston 152 to move away from the piston check member 156, thus allowing hydraulic fluid to pass through second bore portion 166, first bore portion 164 and apertures 170 in piston 152 to the oil system reservoir.

The bypass valve of the present invention provides a number of advantages over that of the prior art. For example, bypass valve 150 is not pressure compensated—it is spring biased to open, pressure to close. Thus, when the hydraulic work circuit achieves operating pressure, the bypass valve of the present invention closes so as to direct any bypass hydraulic fluid flow back into the work circuit, thus conserving energy. In contrast, in a pressure compensated type of valve, a given amount of hydraulic fluid is "bled-off" through the entire work cycle thus reducing the output horsepower of the gear pump. In addition, the bypass valve of the present invention is located within the pump, and thus, additional time is not required to mount the valve, as in the case of the prior art pressure compensated type valve, and the only hardware required in this case is a hydraulic hose connecting the gear pump to the oil system reservoir. The dry valve of the present invention also provides a number of advantages over the prior art. For example, dry valve 100 is substantially smaller than prior art dry valves and does not require a bulky actuating mechanism present in prior art designs. In addition, lubrication through an annular area 132, rather than through an aperture within the valve plate, results in a more uniform and consistent hydraulic fluid flow through the valve and the associated gear pump. Lastly, by utilizing a pneumatic two-way valve to control the rotation of the valve plate, rather than by rotation of the cylinder rod to cause translational movement of the valve plate, the dry valve of the present invention is significantly more responsive to the requirements of the hydraulic circuit associated with the gear pump assembly.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. Valving apparatus comprising first valve means having a bore therein, a plate member received within said bore and rotatable therein, and means for rotating said plate member within said bore to control the flow of fluid therethrough, said plate member being rotatable by said rotating means between a first position wherein said plate member substantially blocks the flow of fluid through said bore and a second position wherein said plate member permits the flow of fluid through said bore, the periphery of said plate member and the surface defining said bore defining an annular area when said plate member is in said first position permitting the flow of fluid therethrough, and second valve means comprising a piston member slidingly movable within said second valve means, said piston member having a longitudinally extending bore therein and at least one radially directed aperture passing through the periphery thereof, said at least one radially directed aperture being in fluidic communication with said longitudinally extending bore, a piston check member oppositely disposed to said piston member and means for biasing said piston member, said piston member being movable within said second valve means to control the flow of fluid through said longitudinally extending bore and said at least one radially directed aperture.

2. The apparatus as defined in claim 1 wherein said rotating means comprises actuating means operatively connected to said plate member.

3. The apparatus as defined in claim 2 wherein said actuating means comprises a housing having a bore therein, a piston member slidingly movable in said bore, and means interconnecting said piston member to said plate member.

4. The apparatus as defined in claim 3 wherein said interconnecting means comprises a shaft member operatively connected to said plate member and means interconnecting said shaft member to said piston member.

5. The apparatus as defined in claim 3 wherein said piston member is slidingly movable in said bore in said housing between a first position and a second position, movement of said piston causing rotation of said shaft member and said plate member.

6. The apparatus as defined in claim 5 wherein said first position of said piston member corresponds within said first position of said plate member and said second position of said piston member corresponds with said second position of said plate member.

7. The apparatus as defined in claim 1 wherein said biasing means is interposed between said piston member and said piston check member urging said piston member into a first position permitting the flow of fluid through said piston member, said piston member being slidingly movable into a second position preventing the flow of fluid through said piston member.

8. The apparatus as defined in claim 7 wherein said piston check member contacts said piston member preventing the flow of fluid through said longitudinally extending bore when said piston member is in said second position.

9. The apparatus as defined in claim 7 further including a sleeve member, said piston member being slidingly movable in said sleeve member between said first position and said second position.

10. Valving apparatus comprising a body member having a bore therethrough, a plate member received within said bore in said body member and rotatable therein, and means for rotating said plate member within said bore in said body member to control the flow of fluid therethrough, said plate member being rotatable by said rotating means between a first position wherein said plate member substantially blocks the flow of fluid through said body member and a second position wherein said plate member permits the flow of fluid through said body member, the periphery of said plate member and the surface defining said bore in said body member defining an annular area when said plate member is in said first position permitting the flow of fluid therethrough.

11. The apparatus as defined in claim 1 wherein said rotating means comprises actuating means operatively connected to said plate member.

12. The apparatus as defined in claim 11 wherein said actuating means comprises a housing having a bore therein, a piston member slidingly movable in said bore, and means interconnecting said piston member to said plate member.

13. The apparatus as defined in claim 12 wherein said interconnecting means comprises a shaft member operatively connected to said plate member and means interconnecting said shaft member to said piston member.

14. The apparatus as defined in claim 12 wherein said piston member is slidingly movable in said bore in said housing between a first position and a second position, movement of said piston member causing rotation of said shaft member and said plate member.

15. The apparatus as defined in claim 14 wherein said first position of said piston member corresponds with said first position of said plate member and said second position of said piston member corresponds with said second position of said plate member.

16. Valving apparatus comprising a housing, a piston member slidingly movable within said housing, said piston member having a longitudinally extending bore therein and at least one radially directed aperture passing through the periphery thereof, said at least one radially directed aperture being in fluidic communication with said longitudinally extending bore, a piston check member located within said housing and oppositely disposed to said piston member and means for biasing said piston member, said piston member being movable in said housing to control the flow of fluid therethrough.

17. The apparatus as defined in claim 16 wherein said biasing means is interposed between said piston member and said piston check member urging said piston member into a first position permitting the flow of fluid through said piston member, said piston member being slidingly movable into a second position preventing the flow of fluid through said piston member.

18. The apparatus as defined in claim 17 wherein said piston check member contacts said piston member preventing the flow of fluid through said longitudinally extending bore when said piston member is in said second position.

19. The apparatus as defined in claim 17 further including a sleeve member received within said housing, said piston member being slidingly movable in said sleeve member between said first position and said second position.

* * * * *